United States Patent
Donath, Jr. et al.

(10) Patent No.: US 6,438,771 B1
(45) Date of Patent: Aug. 27, 2002

(54) FAUCET HANDLE MECHANISM

(75) Inventors: Edward R. Donath, Jr., Westlake; Matthew S. McMaster, Medina; Owen K. Patton, Solon, all of OH (US)

(73) Assignee: Moen Incorporated, North Olmsted, OH (US)

( * ) Notice: Subject to any disclaimer, the term of this patent is extended or adjusted under 35 U.S.C. 154(b) by 0 days.

(21) Appl. No.: 09/802,386

(22) Filed: Mar. 9, 2001

(51) Int. Cl.7 ............................................... F16K 31/60
(52) U.S. Cl. ............................... 4/678; 4/675; 137/359; 137/801; 251/293
(58) Field of Search ........................... 4/675, 676, 678, 4/677, 695; 137/359, 360, 801; 251/293

(56) References Cited

U.S. PATENT DOCUMENTS

| | | |
|---|---|---|
| 1,825,364 A | 9/1931 | Ross |
| 2,596,795 A | 5/1952 | Schulze |
| 3,010,743 A | 11/1961 | Bengtson, Jr. |
| 3,250,148 A | 5/1966 | Soles |
| 3,396,604 A | 8/1968 | Samuels et al. |
| 3,572,162 A | 3/1971 | Gresham et al. |
| 3,791,402 A | 2/1974 | Shuler |
| 4,065,216 A | 12/1977 | Nelson |
| 4,306,468 A | 12/1981 | Bolgert |
| 4,515,037 A | 5/1985 | Block |
| 4,565,350 A | 1/1986 | Rozek |
| 4,593,430 A | 6/1986 | Spangler et al. |
| 4,616,673 A | 10/1986 | Bondar |
| 4,739,788 A | 4/1988 | Reback |
| 4,766,642 A | 8/1988 | Gaffney et al. |
| 4,794,945 A | 1/1989 | Reback |
| 4,813,444 A | 3/1989 | Paul |
| 4,823,435 A | 4/1989 | Chappuis |
| 4,842,009 A | 6/1989 | Reback |
| 4,961,443 A | 10/1990 | Buccicone et al. |
| 4,977,641 A | 12/1990 | Steffs |
| 5,025,826 A | 6/1991 | Schoepe et al. |
| 5,093,959 A | 3/1992 | McTargett et al. |
| 5,123,445 A * | 6/1992 | Chung-Shan ................ 137/801 |
| 5,257,645 A * | 11/1993 | Scully et al. ................ 137/359 |
| 5,551,124 A | 9/1996 | Zeringue |
| 5,671,904 A | 9/1997 | Minutillo |
| 5,741,003 A | 4/1998 | Segien, Jr. |
| 5,947,149 A * | 9/1999 | Mark .......................... 137/359 |
| 6,279,604 B1 * | 8/2001 | Korb et al. .................. 137/359 |

* cited by examiner

Primary Examiner—Charles R. Eloshway
(74) Attorney, Agent, or Firm—Cook, Alex, McFarron, Manzo, Cummings & Mehler, Ltd.

(57) ABSTRACT

A faucet handle mechanism for attaching a faucet handle to a faucet valve body, which valve body has a rotatable valve stem, includes an adapter coaxial with and attached to the valve stem for concurrent rotation with the stem. There is an insert coaxial with and attached to the adapter for concurrent rotation with the insert and stem. A handle is coaxial with and attached to the insert for concurrent rotation with the insert, adapter and valve stem. A fastener secures the adapter, insert and handle together. There is a generally cylindrical chassis coaxial with and extending about the adapter, with the chassis being non-rotatably attached to the valve body. A shell is non-rotatably mounted on the chassis, with the chassis having an upper bearing surface which rotatably supports a lower bearing surface on the insert. The chassis and adapter have cooperating elements which prevent relative axial movement therebetween.

17 Claims, 5 Drawing Sheets

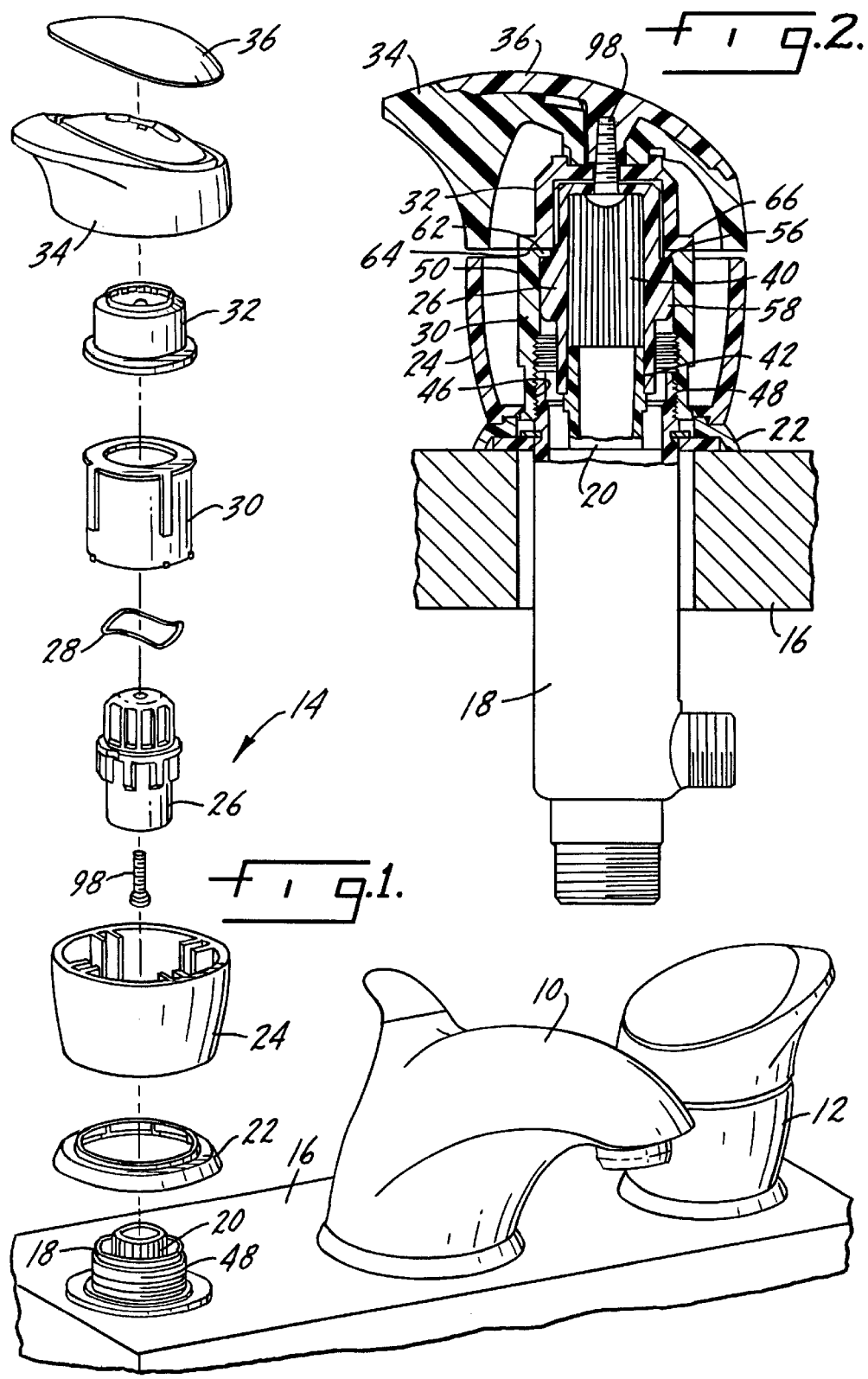

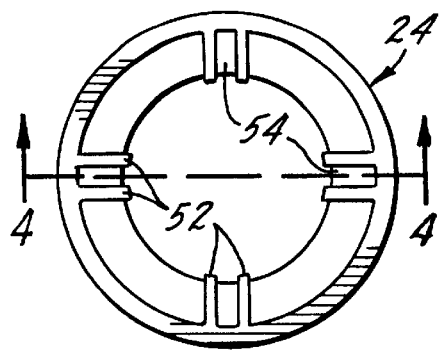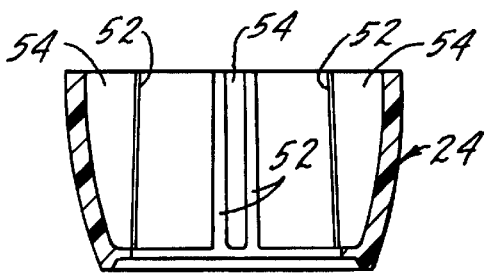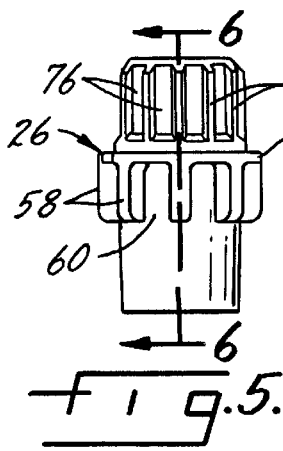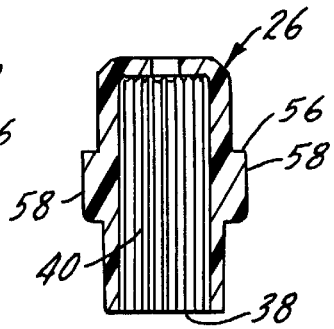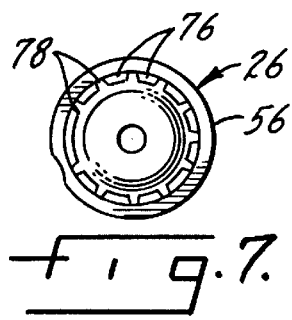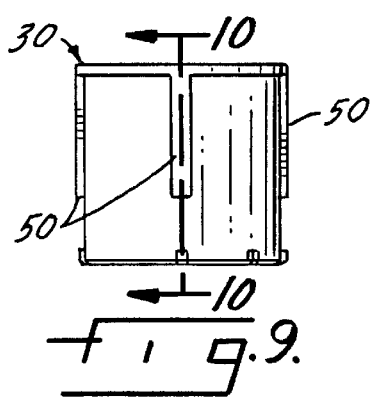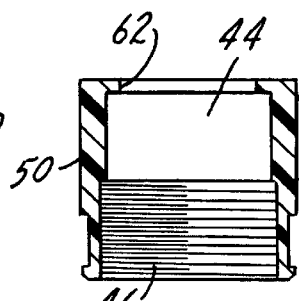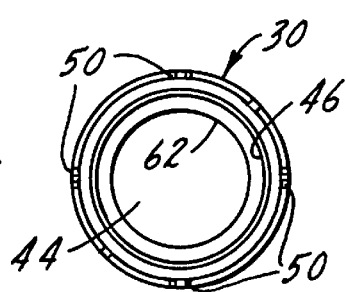

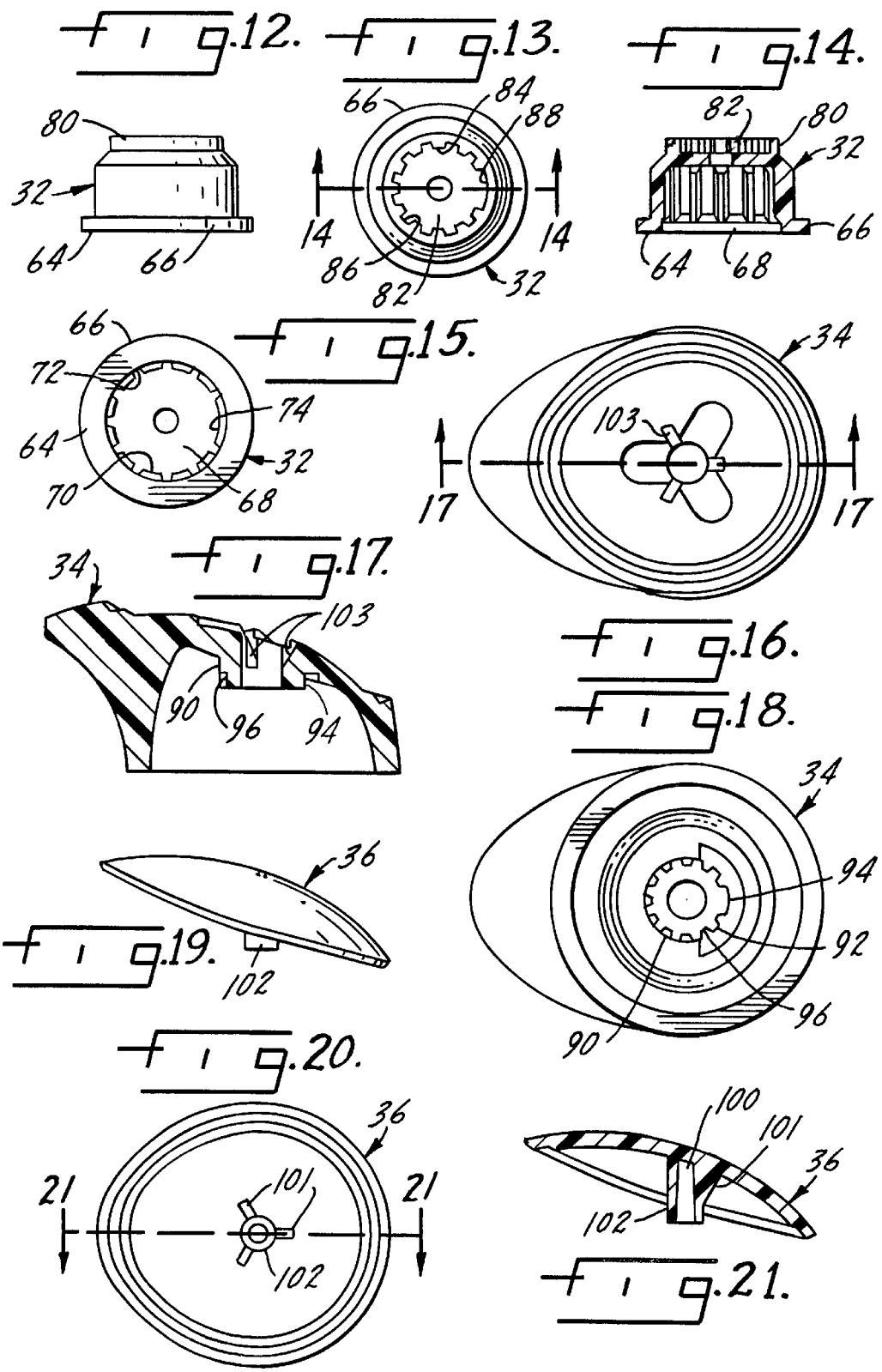

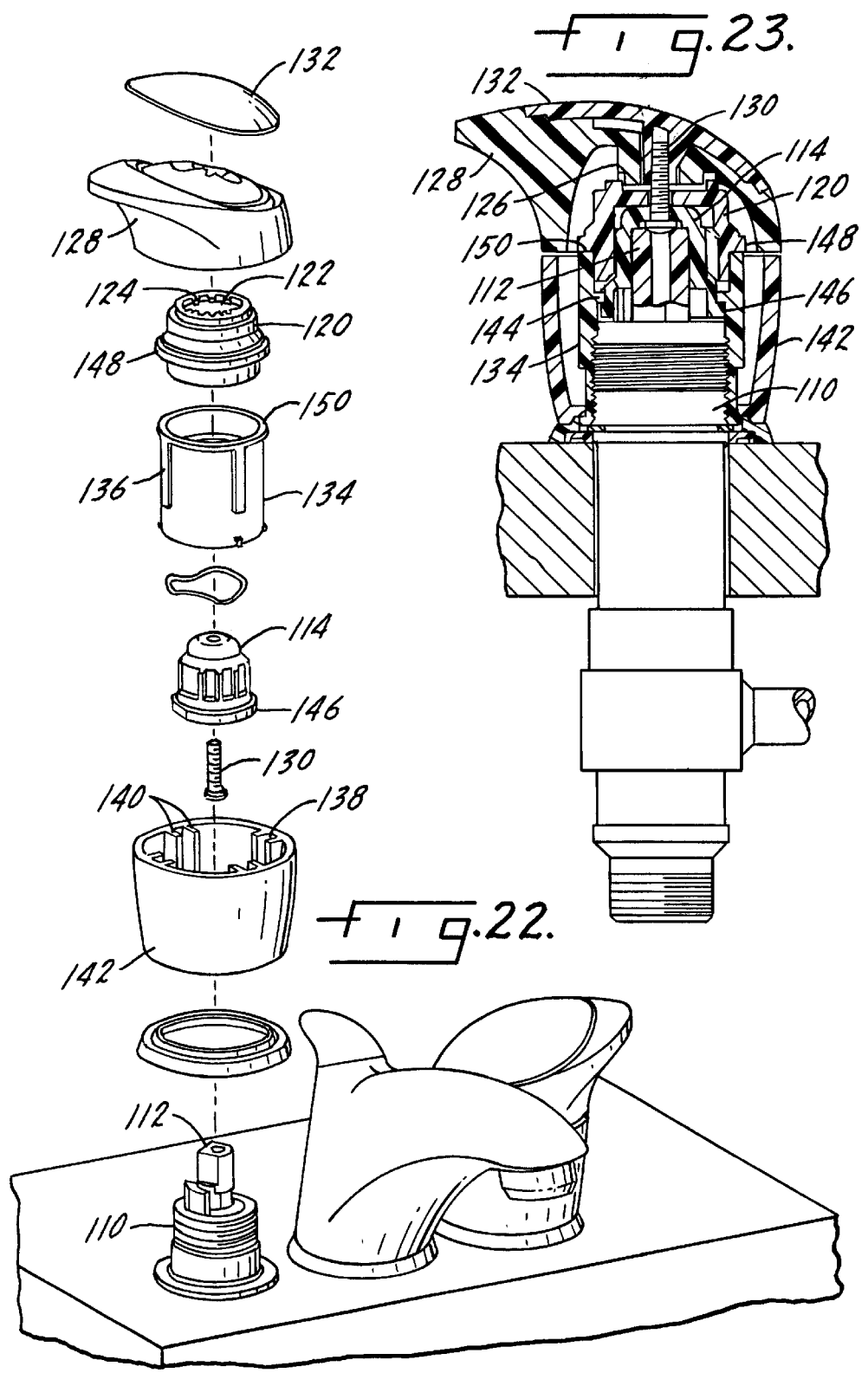

US 6,438,771 B1

FAUCET HANDLE MECHANISM

THE FIELD OF THE INVENTION

The present invention relates to a faucet handle mechanism for attaching a faucet handle to a faucet valve body which has a rotatable stem. Typically, such mechanisms may be used in either two-handle faucet configurations or in a single handle faucet configuration. The mechanism consists of a plurality of interlocking parts, simple in construction, reliable in operation, and which parts, when assembled, provide no visible indication of the mechanism for attachment. The mechanism, as shown, may be used in what is known as a widespread faucet configuration in which the space between the hot and cold water faucet handles may be 8" or may be used in what is termed a "mini" widespread faucet handle configuration in which the space between handles is 4". The mechanism may also be used in a single lever or single handle faucet configuration in which a single handle controls both temperature and volume of the water discharged through the faucet spout.

SUMMARY OF THE INVENTION

The present invention relates to a faucet handle mechanism and in particular to such a mechanism which is simple in construction and reliable in operation.

Another purpose of the invention is a faucet handle mechanism, for use on a variety of different faucet configurations, and in which the fastener or method of attaching the handle to the valve stem is hidden from view.

Other purposes will appear in the ensuing specification, drawings and claims.

BRIEF DESCRIPTION OF THE DRAWINGS

The invention is illustrated diagrammatically in the following drawings wherein:

FIG. 1 is a perspective view, in part exploded, illustrating a two-handle faucet;139

FIG. 2 is a vertical section through the faucet handle mechanism of FIG. 1;

FIG. 3 is a top view of the handle shell;

FIG. 4 is a section along plane 4—4 of FIG. 3;

FIG. 5 is a side view of the handle adapter;

FIG. 6 is a section along plane 6—6 of FIG. 5;

FIG. 7 is a top view of the handle adapter;

FIG. 8 is a bottom view of the handle adapter;

FIG. 9 is a side view of the handle chassis;

FIG. 10 is a section along plane 10—10 of FIG. 9;

FIG. 11 is a bottom view of the handle chassis;

FIG. 12 is a side view of the handle insert;

FIG. 13 is a top view of the handle insert;

FIG. 14 is a section along plane 14—14 of FIG. 13;

FIG. 15 is a bottom view of the handle insert;

FIG. 16 is a top view of the handle;

FIG. 17 is a section along plane 17—17 of FIG. 16;

FIG. 18 is a bottom view of the handle;

FIG. 19 is a side view of the handle cap;

FIG. 20 is a bottom view of the handle cap;

FIG. 21 is a section along plane 21—21 of FIG. 20;

FIG. 22 is a perspective, in part exploded, of a second embodiment of faucet handle construction;

FIG. 23 is a vertical section through the faucet handle mechanism of FIG. 22;

DESCRIPTION OF THE PREFERRED EMBODIMENT

Figures 24, 25, 26:
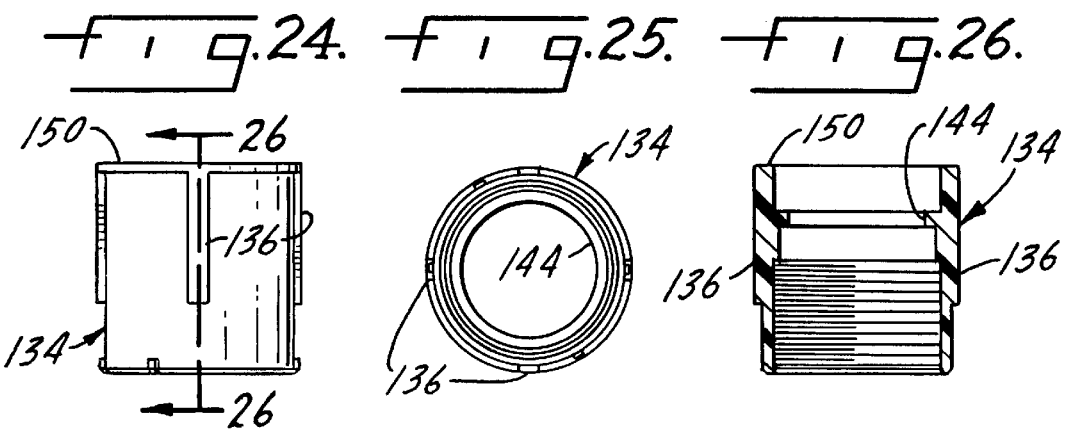
FIG. 24 is a side view of the handle chassis in the FIG. 22 embodiment.
FIG. 25 is a bottom view of the handle chassis of FIG. 24.
FIG. 26 is a section along plane 26—26 of FIG. 24

FIG. 1 illustrates a faucet assembly commonly known in the trade as a two handle widespread and which includes a centrally located spout 10 and a right side or cold water faucet handle 12 and a left side or hot water faucet handle 14. The handle 14 is shown in exploded perspective form. Extending upwardly through the faucet deck 16 is a faucet valve body 18 having a valve operating stem 20. Rotation of the stem 20 controls the volume of water, from the hot side, flowing through the spout 10.

The components of the faucet handle mechanism are particularly shown in FIG. 1. There is an escutcheon 22 which will extend about the valve body and a handle shell 24, which is seated on top of the escutcheon. There is an adapter 26, a wave washer 28, and a handle chassis 30. The wave washer will be positioned between facing surfaces of the adapter and a handle insert 32. The handle is indicated at 34 and there is a handle cap 36. The components just described are shown in assembled form in the section of FIG. 2.

As indicated above, the escutcheon 22 is seated on the sink deck and the shell 24 is seated on top of the escutcheon and forms a portion of the faucet handle exterior, and with the handle 34 and the handle cap 36 defines the overall appearance and usable components for the faucet handle.

The adapter 26 has an interior bore 38 with a series of uniformly spaced splines 40, illustrated in FIG. 8. The splines 40 on the adapter interact with the splined exterior 42 on the valve stem 20. Thus, the adapter will drive or turn the valve stem.

The chassis 30 has an interior bore 44 with a threaded portion 46, which threaded portion engages the exterior threads 48 on the valve body 18. The chassis 30 is thus threadedly attached to the valve body.

The exterior of the chassis 30 has a plurality, in this case four, uniformly spaced axially extending projections 50 which will interact with the interior of the shell 24. As shown specifically in FIGS. 3 and 4, the interior of the shell 24 has four pairs of spaced ribs 52, with each pair of ribs defining a slot 54, which slots will receive the projections 50 providing a non-rotatable connection between the shell 24 and the chassis 30.

The exterior of the adapter 26, generally intermediate its opposite ends, has a ledge 56 which is above a series of projections 58 which define a series of uniformly sized grooves 60. When the chassis 30 is positioned coaxial with and exteriorly of the adapter 26, the inwardly extending annular shoulder 62 of the chassis extends directly above the ledge 56. Thus, the adapter 26 is attached to and rotatable with the valve stem and the chassis 30 prevents relative axial movement between the adapter and the valve stem. The upper surface of the shoulder 62 will form a bearing surface for rotary movement of the handle insert 32.

As shown particularly in FIG. 2, the handle insert 32 is in driving engagement with the adapter 26 and has a lower bearing surface 64 formed by a flange 66 which rides on the shoulder 62 of the chassis 30. The interior of the insert 32, as shown in FIGS. 12–15, has a chamber 68 with a series of inwardly directed projections 70 which form a plurality of uniformly spaced grooves 72 and a non-uniform projection. These grooves and projections interact with mating grooves and projections 76 and 78 on the exterior of the adapter 26 to form the driving connection between these two elements. The non-uniformity of the projections and grooves assures proper alignment of these two elements.

The insert 32 has an upwardly extending annular shoulder 80 which defines an interior space 82 having a series of projections 84 defining a plurality of uniformly spaced grooves 86 and a non-uniform groove 88. These grooves and projections will interact with the interior boss 90, shown in FIG. 17, of the cap 34. As particularly shown in FIG. 18, the exterior of the boss 90 has projections 92, one of which, at 94, is of non-uniform, size, and grooves 96, to thereby form a driving connection between the handle and the insert 32. The assembly of the adapter, insert and handle are secured together by a fastener 98 which extends through the upper portion of the adapter, through the handle insert, through the boss 90 of the handle 34 and into a bore 100 formed in a central boss 102 of the cap 36. The fastener 98 secures the cap to the handle and attaches all of the rotatable elements together, thus providing a faucet handle mechanism in which there is no visible means of securing the mechanism to the faucet valve stem. The cap boss 102 includes three projections 101 which seat in slots 103 in the handle 34 to assure proper orientation of these elements.

Figures 27, 28, 29:
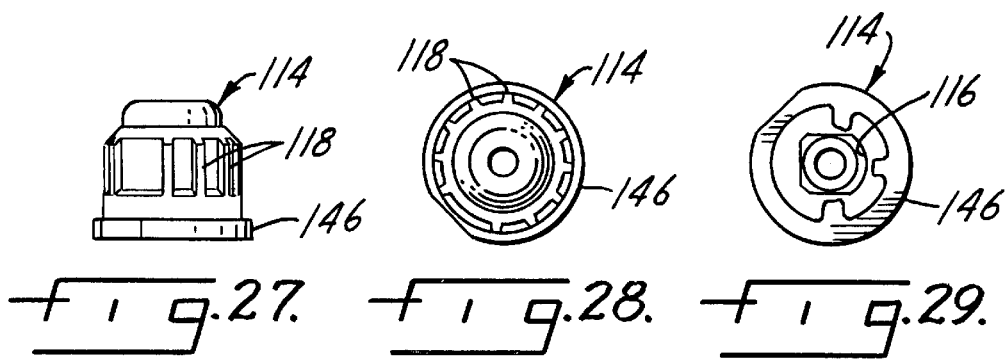
FIG. 27 is a side view of the handle adapter of the FIG. 22 embodiment.
FIG. 28 is a top view of the handle adapter of FIG. 27.
FIG. 29 is a bottom view of the handle adapter of FIG. 27.
Figures 30, 31, 32:
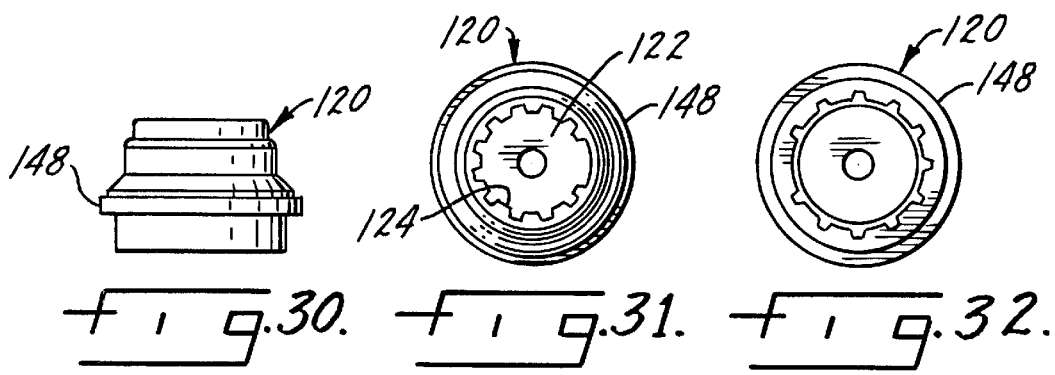
FIG. 30 is a side view of the handle insert of the FIG. 22 embodiment.
FIG. 31 is a top view of the handle insert of FIG. 30.
FIG. 32 is a bottom view of the handle insert of FIG. 30.

The faucet shown in FIGS. 22–32 is commonly known in the trade as a mini widespread, and the principal difference between this embodiment of the invention and that shown in FIGS. 1–21, is that the stem of the valve does not have exterior splines, but rather has what is known as a D-shaped cross section. The faucet valve body is indicated at 110 and the rotatable valve stem is shown at 112. The adapter 114 has an interior bore 116 of the same D-shaped cross section as the valve stem 112 and thus the adapter forms the drive connection between the handle and the valve stem. The exterior of the adapter 114 has a series of outwardly-extending projections 118, shown in FIGS. 27 and 28, which function in the manner of the FIGS. 1–21 embodiment to interengage the adapter 114 with the insert 120. The insert 120, as in the earlier embodiment, has an upwardly facing interior opening 122 with a series of projections 124 which will interact with projections and grooves on the boss 126 of the handle 128. The construction is similar to that in the first embodiment. A fastener 130 will attach the adapter, insert and handle by extending into the bore of the handle cap 132.

The chassis 134 again has a series of axially extending projections 136 which will interact with the slot 138 formed between adjoining pairs of ribs 140, again as in the FIGS. 1–21 embodiment. Thus, the chassis and the shell 142 are joined together, prohibiting rotation therebetween.

The chassis 134 extends over the adapter 114 and has an inwardly-directed annular projection 144 which is seated on an outwardly-extending flange 146 of the adapter when the faucet handle mechanism is assembled as shown in FIG. 23. In this manner, the adapter 118 is prevented from axial movement relative to the valve stem 112. The insert 120 has an annular shoulder 148, the lower surface of which will ride on the upper surface 150 of the chassis 134 providing the same rotatable bearing surfaces as in the FIGS. 1–21 embodiment.

The principal difference between the two embodiments of the invention shown is in the valve stem which necessitates a change in the interior bore of the adapter, which also dictates a different structural relationship for holding the adapter against axial movement by means of the inwardly-directed shoulder of the chassis.

The invention is particularly directed to a simply constructed and reliable faucet handle mechanism made of a minimum number of parts and which hides or masks any fastener which is used to attach the handle mechanism to the valve body and the valve stem. This provides a pleasing exterior appearance for the handle mechanism and one which may not be vandalized as there is no visible means to remove the handle from the valve stem. The screw which is used to fasten the several described members together is completely on the inside of the mechanism.

Whereas the preferred form of the invention has been shown and described herein, it should be realized that there may be many modifications, substitutions and alterations thereto.

The embodiments of the invention in which an exclusive property or privilege is claimed are defined as follows:

1. A faucet handle mechanism for attaching a faucet handle to a faucet valve body having a rotatable valve stem extending outwardly therefrom, said mechanism including:

an adapter coaxial with and attached to the valve stem for concurrent rotation therewith, an insert coaxial with and attached to the adapter for concurrent rotation therewith, a handle coaxial with and attached to the insert for concurrent rotation therewith, a fastener securing said adapter, insert, and handle together, a generally cylindrical chassis coaxial with and extending about said adapter, said chassis being non-rotatably attached to said valve body, a shell non-rotatably mounted on said chassis, said chassis having an upper bearing surface which rotatably supports a lower bearing surface on said insert whereby said insert, adapter and valve stem may be rotated relative to said chassis, said chassis and adapter having cooperating means thereon which prevent relative axial movement therebetween.

2. The faucet handle mechanism of claim 1 wherein said valve stem includes a plurality of axially extending splines, and said adapter has an internal bore with a configuration which mates with that of the valve stem splines to provide for concurrent rotation therebetween.

3. The faucet handle mechanism of claim 1 wherein said valve stem has a D-shaped cross section, and said adapter has an internal bore with a mating D-shaped cross section to provide a rotatable drive connection therebetween.

4. The faucet handle mechanism of claim 1 wherein said chassis has a plurality of circumferentially spaced axially extending projections, the interior of said shell having a plurality of circumferentially spaced grooves, with the spacing of said grooves and said chassis projections being the same to provide a non-rotatable connection therebetween.

5. The faucet handle mechanism of claim 4 wherein the grooves on said shell are each formed by a pair of inwardly-directed ribs.

6. The faucet handle mechanism of claim 1 wherein the exterior of said valve body and the interior of said chassis have a threaded connection therebetween.

7. The faucet handle mechanism of claim 1 wherein the upper bearing surface of said chassis is formed at the upper end of said chassis, with the lower bearing surface on said insert being formed at the lower end of said insert.

8. The faucet handle mechanism of claim 1 wherein the bearing surface on said chassis is formed at the upper end of said chassis, and the bearing surface on said insert is formed by a lower surface of an intermediate outwardly-extending circumferential projection on said insert.

9. The faucet handle mechanism of claim 1 wherein said chassis has an inwardly-extending annular projection which overlies an outwardly-extending annular projection on said adapter to prevent relative axial movement therebetween.

10. The faucet handle mechanism of claim 9 wherein said chassis inwardly-directed annular projection is at the upper end of said chassis and forms said chassis bearing surface.

11. The faucet handle mechanism of claim 9 wherein said chassis inwardly-directed annular projection is spaced from the upper end of said chassis.

12. The faucet handle mechanism of claim 1 wherein the attachment of said insert to said adapter for concurrent rotation includes a plurality of mating axially extending projections and grooves on said elements.

13. The faucet handle mechanism of claim 12 wherein said mating projections and grooves are on the exterior of said adapter and on an interior surface of said insert.

14. The faucet handle mechanism of claim 1 wherein the attachment of said insert to said handle for concurrent rotation thereof includes a plurality of mating grooves and projections on said handle and insert.

15. The faucet handle mechanism of claim 14 wherein the grooves and projections on said insert for attachment to said handle are on an interior surface thereof, with the grooves and projections on said handle being formed on a downwardly-extending boss, which boss extends into said insert.

16. The faucet handle mechanism of claim 1 wherein said handle includes a handle cap secured thereto by said fastener.

17. The faucet handle mechanism of claim 16 wherein said fastener extends through adjoining surfaces of said adapter, handle insert, and handle cap.

\* \* \* \* \*